(12) United States Patent
van Rietschote

(10) Patent No.: US 7,603,670 B1
(45) Date of Patent: Oct. 13, 2009

(54) VIRTUAL MACHINE TRANSFER BETWEEN COMPUTER SYSTEMS

(75) Inventor: Hans F. van Rietschote, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1137 days.

(21) Appl. No.: 10/109,406

(22) Filed: Mar. 28, 2002

(51) Int. Cl.
G06F 9/455 (2006.01)

(52) U.S. Cl. .................................................. 718/1
(58) Field of Classification Search .................. 718/1
See application file for complete search history.

(56) References Cited

U.S. PATENT DOCUMENTS

| | | | |
|---|---|---|---|
| 4,912,628 A | 3/1990 | Briggs | |
| 4,969,092 A | 11/1990 | Shorter | |
| 5,257,386 A | 10/1993 | Saito | |
| 5,408,617 A | 4/1995 | Yoshida | |
| 5,546,558 A | 8/1996 | Jacobson et al. | |
| 5,621,912 A | 4/1997 | Borruso et al. | |
| 5,809,285 A | 9/1998 | Hilland | |
| 5,852,724 A | 12/1998 | Glenn, II et al. | |
| 5,872,931 A | 2/1999 | Chivaluri | |
| 5,944,782 A | 8/1999 | Noble et al. | |
| 5,987,565 A | 11/1999 | Gavaskar | |
| 6,003,065 A * | 12/1999 | Yan et al. ................. | 709/201 |
| 6,029,166 A | 2/2000 | Mutalik et al. | |
| 6,075,938 A | 6/2000 | Bugnion et al. | |
| 6,151,618 A | 11/2000 | Wahbe et al. | |
| 6,230,246 B1 | 5/2001 | Lee et al. | |
| 6,298,390 B1 | 10/2001 | Matena et al. | |
| 6,298,428 B1 | 10/2001 | Munroe et al. | |
| 6,324,627 B1 | 11/2001 | Kricheff et al. | |
| 6,341,329 B1 | 1/2002 | LeCrone et al. | |
| 6,363,462 B1 | 3/2002 | Bergsten | |
| 6,370,646 B1 * | 4/2002 | Goodman et al. ........... | 713/100 |
| 6,397,242 B1 | 5/2002 | Devine et al. | |
| 6,421,739 B1 | 7/2002 | Holiday | |
| 6,438,642 B1 | 8/2002 | Shaath | |
| 6,493,811 B1 | 12/2002 | Blades et al. | |
| 6,496,847 B1 | 12/2002 | Bugnion et al. | |

(Continued)

OTHER PUBLICATIONS

VMware, Inc., "VMware Control Center," 2003, 3 pages.

(Continued)

Primary Examiner—Andy Ho
(74) Attorney, Agent, or Firm—Lawrence J. Merkel; Meyertons, Hood, Kivlin, Kowert & Goetzel, P.C.

(57) ABSTRACT

One or more computer systems, a carrier medium, and a method are provided for transferring a virtual machine between computer systems. In one embodiment, a first computer system and a second computer system are coupled to communicate at least intermittently. In response to a request, a first virtual machine executing on the first computer system is transferred to the second computer system. For example, in one embodiment, the first computer system suspends the first virtual machine to an image, which is transmitted to the second computer system. The first virtual machine is resumed on the second computer system from the image. In one particular implementation, the first computer system may suspend the image to a first storage device accessible to the first computer system, and the image may be copied over a network to a second storage device accessible to the second computer system.

24 Claims, 4 Drawing Sheets

U.S. PATENT DOCUMENTS

| | | | |
|---|---|---|---|
| 6,542,909 | B1 | 4/2003 | Tamer et al. |
| 6,694,346 | B1 | 2/2004 | Aman et al. |
| 6,704,925 | B1 | 3/2004 | Bugnion |
| 6,711,672 | B1 | 3/2004 | Agesen |
| 6,718,538 | B1 | 4/2004 | Mathiske |
| 6,725,289 | B1 | 4/2004 | Waldspurger et al. |
| 6,735,601 | B1 | 5/2004 | Subrahmanyam |
| 6,757,778 | B1 | 6/2004 | van Rietschote |
| 6,763,440 | B1 * | 7/2004 | Traversat et al. ............ 711/159 |
| 6,763,445 | B1 | 7/2004 | Klein et al. |
| 6,772,231 | B2 | 8/2004 | Reuter et al. |
| 6,785,886 | B1 | 8/2004 | Lim et al. |
| 6,789,103 | B1 * | 9/2004 | Kim et al. .................. 709/203 |
| 6,789,156 | B1 | 9/2004 | Waldspurger |
| 6,795,966 | B1 * | 9/2004 | Lim et al. ..................... 718/1 |
| 6,802,062 | B1 | 10/2004 | Oyamada et al. |
| 6,961,806 | B1 | 11/2005 | Agesen et al. |
| 6,961,941 | B1 | 11/2005 | Nelson et al. |
| 6,985,956 | B2 | 1/2006 | Luke et al. |
| 7,069,413 | B1 | 6/2006 | Agesen et al. |
| 7,082,598 | B1 | 7/2006 | Le et al. |
| 7,089,377 | B1 | 8/2006 | Chen |
| 7,111,086 | B1 | 9/2006 | Ecoleston et al. |
| 7,111,145 | B1 | 9/2006 | Chen et al. |
| 7,111,481 | B2 | 9/2006 | Green et al. |
| 7,203,944 | B1 | 4/2007 | van Rietschote |
| 7,213,246 | B1 | 5/2007 | van Rietchote et al. |
| 7,246,200 | B1 | 7/2007 | van Rietschote et al. |
| 7,266,637 | B1 | 9/2007 | van Rietschote |
| 2001/0016879 | A1 | 8/2001 | Sekiguchi et al. |
| 2002/0049869 | A1 | 4/2002 | Ohmura et al. |
| 2002/0069369 | A1 * | 6/2002 | Tremain ..................... 713/201 |
| 2002/0099753 | A1 | 7/2002 | Hardin et al. |
| 2002/0129078 | A1 | 9/2002 | Plaxton et al. |
| 2003/0028861 | A1 | 2/2003 | Wallman et al. |
| 2003/0033431 | A1 | 2/2003 | Shinomiya |
| 2003/0110351 | A1 | 6/2003 | Blood et al. |
| 2004/0010787 | A1 * | 1/2004 | Traut et al. ..................... 718/1 |

OTHER PUBLICATIONS

InfoWorld, Robert McMillan, "VMware Launches VMware Control Center," 2003, 2 pages.
VMware, Inc., "VMware Control Center: Enterprise-class Software to Manage and Control Your Virtual Machines," 2003, 2 pages.
John Abbott, Enterprise Software, "VMware Heads Toward Utility Computing With New Dynamic Management Tools," Jul. 1, 2003, 4 pages.
Dejan S. Milogicic, et al., "Process Migration," Aug. 10, 1999, 49 pages.
Xian-He Sun, et al., "A Coordinated Approach for Process Migration in Heterogeneous Environments," 1999, 12 pages.
Kasidit Chanchio, et al., "Data Collection and Restoration for Heterogeneous Process Migration," 1997, 6 pages.
Kasidit Chanchio, et al., "A Protocol Design of Communication State Transfer for Distributed Computing," Publication date unknown, 4 pages.
SourceForge™, "Project: openMosix: Document Manager: Display Document," 14 pages.
OpenMosix, "The openMosix HOWTO: Live free() or die ()," May 7, 2003, 3 pages.
OpenMosix, "openMosix Documentation Wiki—don't," May 7, 2003, 2 pages.
Sapuntzakis, et al., "Optimizing the Migration of Virtual Computers," Proceedings of the Fifth Symposium on Operating Systems Design and Implementation, Dec. 2002, 14 pages.
Helfrich, et al., "Internet Suspend/Resume," ISR Project Home Page, 2003, 4 pages.
Kozuch, et al., "Internet Suspend/Resume," IRP-TR-02-01, Apr. 2002, Accepted to the Fourth IEEE Workshop on Mobile Computing Systems and Applications, Callicoon, NY, Jun. 2002, Intel Research, 9 pages.
Kozuch, et al., "Efficient State Transfer for Internet Suspend/Resume," IRP-TR-02-03, May 2002, Intel Research, 13 pages.
Tolia, et al., "Using Content Addressing to Transfer Virtual Machine State," IRP-TR-02-11, Summer 2002, Intel Research, 11 pages.
Flinn, et al., "Data Staging on Untrusted Surrogates," IRP-TR-03-03, Mar. 2003, Intel Research, To Appear in the Proceedings of the $2^{nd}$ USENIX Conference on File and Storage Technologies, San Francisco, 16 pages.
Tolia, et al., "Opportunistic Use of Content Addressable Storage for Distributed File Systems," IRP-TR-03-02, Jun. 2003, Intel Research, To Appear in the Proceedings of the 2003 USENIX Annual Technical Conference, San Antonio, TX, 16 pages.
Kinshuk Govil, et al., "Cellular Disco: Resource Management Using Virtual Clusters on Shared-Memory Multiprocessors," $17^{th}$ ACM Symposium on Operating Systems Principles (SOSP'99), Published as Operating Systems Review 34(5):154-169, Dec. 1999, pp. 154-169.
Edouard Bugnion, et al., "Disco: Running Commodity Operating Systems on Scalable Multiprocessors," Computer Systems Laboratoy, Stanford, CA, 33 pages.
"White Paper, GSX Server," VMware, Inc., Dec. 2000, pp. 1-9.
"Vmware GSX Serve, The Server Consolidation Solution," VMware, Inc., 2001, 2 pages.
"Manage Multiple Worlds., From Any Desktop," VMware, Inc., 2000, 2 pages.
"VMware ESX Server, The Server Consolidation Solution for High-Performance Environments," VMware, Inc., 2001, 2 pages.
Melinda Varian, "VM and the VM Community: Past, Present, and Future," Operating Systems, Computing and Information Technology, Princeton Univ., Aug. 1997, pp. 1-67.
VERITAS, "Comparison: Microsoft Logical Disk Manager and VERITAS Volume Manager for Windows," May 2001, 4 pages.
VERITAS, "How VERITAS Volume Manager Complements Hardware RAID in Microsoft Server Environments," May 2001, pp. 1-7.
VERITAS, "VERITAS Volume Manager for Windows, Best Practices," May 2001, pp. 1-7.
Barrie Sosinky, Ph.D., "The Business Value of Virtual Volume Management, In Microsoft Window NT and Windows 2000 Netowrks," VERITAS, A white paper for administrators and planners, Oct. 2001, pp. 1-12.
VERITAS, "VERITAS Volume Manager for Windows NT," Version 27, 2001, 4 pages.
"BladeFram™ System Overview," Egenera, Inc., 2001 2 pages.
White Paper, "The Egenera™ Processing Area Network (PAN) Architecture," Egenera, Inc., 2002, 20 pages.
White Paper, "Emerging Server Architectures," Egenera, Inc., 2001, 12 pages.
White Paper, "Improving Data Center Performance," Egenera, Inc., 2001, 19 pages.
White Paper, "Guidelines for Effective E-Business Infrastructure Management," Egenera, Inc., 2001, 11 pages.
White Paper, "The Pros and Cons of Server Clustering in the ASP Environment," Egenera, Inc., 2001, 10 pages.
Position Paper, "Taking Control of The Data Center," Egenera, Inc., 2001, 4 pages.
Position Paper, "The Linux Operating System: How Open Source Software Makes Better Hardware," Egenera, Inc., 2001, 2 pages.
"Solution Overview," TrueSAN Networks, Inc., 2002, 7 pages.
"Simics: A Full System Simulation Platform," Reprinted with permission from Computer, Feb. 2002, © The Institute of Electrical and Electronics Engineering, Inc., pp. 50-58.
"Introduction to Simics Full-System Simulator without Equal," Virtutech, Jul. 8, 2002, 29 pages.
"The Technology of Virtual Machines," A Conneectix White Paper, Connectix Corp., 2001, 13 pages.
"The Technology of Virtual PC," A Conneectix White Paper, Connectix Corp., 2000, 12 pages.
"About LindowsOS," Lindows.com, lindows.com/lindows_products_lindowsos.php, 2002, 2 pages.

"Savannah: This is a Savannah Admin Documentation," Savannah, Free Software Foundation, Inc.© 2000-2002, 31 pages.

"Virtuozzo Basics," Virtuozzo, sw-soft.com/en/products/virtuozzo/basics/, © 1994-2002 SWsoft, printed from web on Dec. 13, 2002, 2 pages.

"Products," Netraverse, Inc, 2002, netraverse.com/products/index.php, printed from web on Dec. 13, 2002, 1 page.

"NeTraverse Win4Lin 4.0—Workstation Edition," Netraverse, Inc, 2002, netraverse.com/products/win4lin40/, printed from web on Dec. 13, 2002, 1 page.

"Win4Lin Desktop 4.0," Netraverse, Inc, 2002, netraverse.com/products/win4lin40/benefits.php, printed from web on Dec. 13, 2002, 1 page.

"Win4Lin Desktop 4.0," Netraverse, Inc, 2002, netraverse.com/products/win4lin40/features.php, printed from web on Dec. 13, 2002, 2 page.

"Win4Lin Desktop 4.0," Netraverse, Inc, 2002, netraverse.com/products/win4lin40/requirements.php, printed from web on Dec. 13, 2002, 2 page.

"Win4Lin Terminal Server 2.0," Netraverse, Inc., 2002, netraverse.com/products/wts, printed from web on Dec. 13, 2002, 1 page.

"Win4Lin Terminal Server 2.0," Netraverse, Inc, 2002, netraverse.com/products/wts/benefits.php, printed from web on Dec. 13, 2002, 1 page.

Win4Lin Terminal Server 2.0, Netraverse, Inc, 2002, netraverse.com/products/wts/features.php, printed from web on Dec. 13, 2002, 2 pages.

Win4Lin Terminal Server 2.0, Netraverse, Inc, 2002, netraverse.com/products/wts/requirements.php, printed from web on Dec. 13, 2002, 2 pages.

Win4Lin Terminal Server 2.0, Netraverse, Inc, 2002, netraverse.com/products/wts/technology.php, printed from web on Dec. 13, 2002, 1 page.

Win4Lin, Netraverse, Inc, 2002, netraverse.com/ support/docs/Win4Lin-whitepapers.php, printed from web on Dec. 13, 2002, 5 pages.

"Virtual PC for Windows," Connectix, Version 5.0, 2002, 2 pages.

Dave Gardner, et al., "Wine FAQ,", © David Gardner 1995-1998, printed from www.winehq.org, 13 pages.

"Winelib User's Guide," Winelib, www.winehq.org, 26 pages.

John R. Sheets, et al. "Wine User Guide," www.winehq.org, pp. 1-53.

"Wine Developer's Guide," pages, www.winehq.org, 1-104.

"What is Virtual Environmnet(VE)?," SWsoft, sw-soft/en/products/virtuozzo/we/, © 1994-2002 SWsoft, printed from web on Dec. 13, 2002, 2 pages.

"U.S. Patent and Trademark Office, "Office Communication" for U.S. Appl. No. 10/108,882 mailed Jun. 24, 2005 (11 pages)."

Office Action for U.S. Appl. 10/108,882 mailed May 8, 2006, 13 pages.

* cited by examiner

VIRTUAL MACHINE TRANSFER BETWEEN COMPUTER SYSTEMS

BACKGROUND OF THE INVENTION

1. Field of the Invention

This invention is related to the field of computer systems and, more particularly, to virtual machines executing on computer systems and mobility of a user's data between computer systems.

2. Description of the Related Art

With computer systems becoming ubiquitous in society, it is becoming increasingly common for a given user to have access to more than one computer system. For example, many users may have access to one or more computer systems at work, as well as one or more computer systems at home. It is also frequent for traveling users to access a computer system at their destination in addition to computer systems at the user's home or office.

With the many different systems to which a user has access, the user may frequently experience the problem of working on a different computer system from the one storing the most recently updated files that the user needs. For example, the user may wish to work on email files, database files, spreadsheets, word processor documents, presentations, etc.

One method the user may employ to retrieve the most up to date files may be to recall where (i.e. on which computer system) the most up to date files are stored and to copy the files to the current computer system. The copy may occur using a network between the two computer systems, storage that is shared between the computer systems, etc. This method requires that the user be able to recall where the files are. Additionally, if the user had left the files open on the computer system which stores the files (e.g. the application which accesses the files is still running on that computer system), there may be uncommitted updates in the memory of that computer system which are not accessible to the user on the current computer system. Even if the updates to the files are committed, the fact that the application has the files open may, in some cases, prevent the user from copying the files.

A second method the user may employ is to actually have his applications executing and/or his files stored on a predetermined computer system, but provide user access from any computer system (e.g. keyboard, mouse, and monitor access may be from any computer system). Essentially, the predetermined computer system receives the user input from the other computer system accessed by the user and provides output (e.g. video output to the monitor, audio output, etc.) to the other computer system. This method may result in slow response to the user (since the input and output travel the network between the computer systems) and also requires network connectivity during the entire user session.

SUMMARY OF THE INVENTION

One or more computer systems, a carrier medium, and a method are provided for transferring a virtual machine between computer systems. In one embodiment, a first computer system and a second computer system are coupled to communicate at least intermittently. In response to a request, a first virtual machine executing on the first computer system is transferred to the second computer system. For example, in one embodiment, the first computer system suspends the first virtual machine to an image, which is transmitted to the second computer system. The first virtual machine is resumed on the second computer system from the image. In one particular implementation, the first computer system may suspend the image to a first storage device accessible to the first computer system, and the image may be copied over a network to a second storage device accessible to the second computer system.

BRIEF DESCRIPTION OF THE DRAWINGS

The following detailed description makes reference to the accompanying drawings, which are now briefly described.

Figure 1:
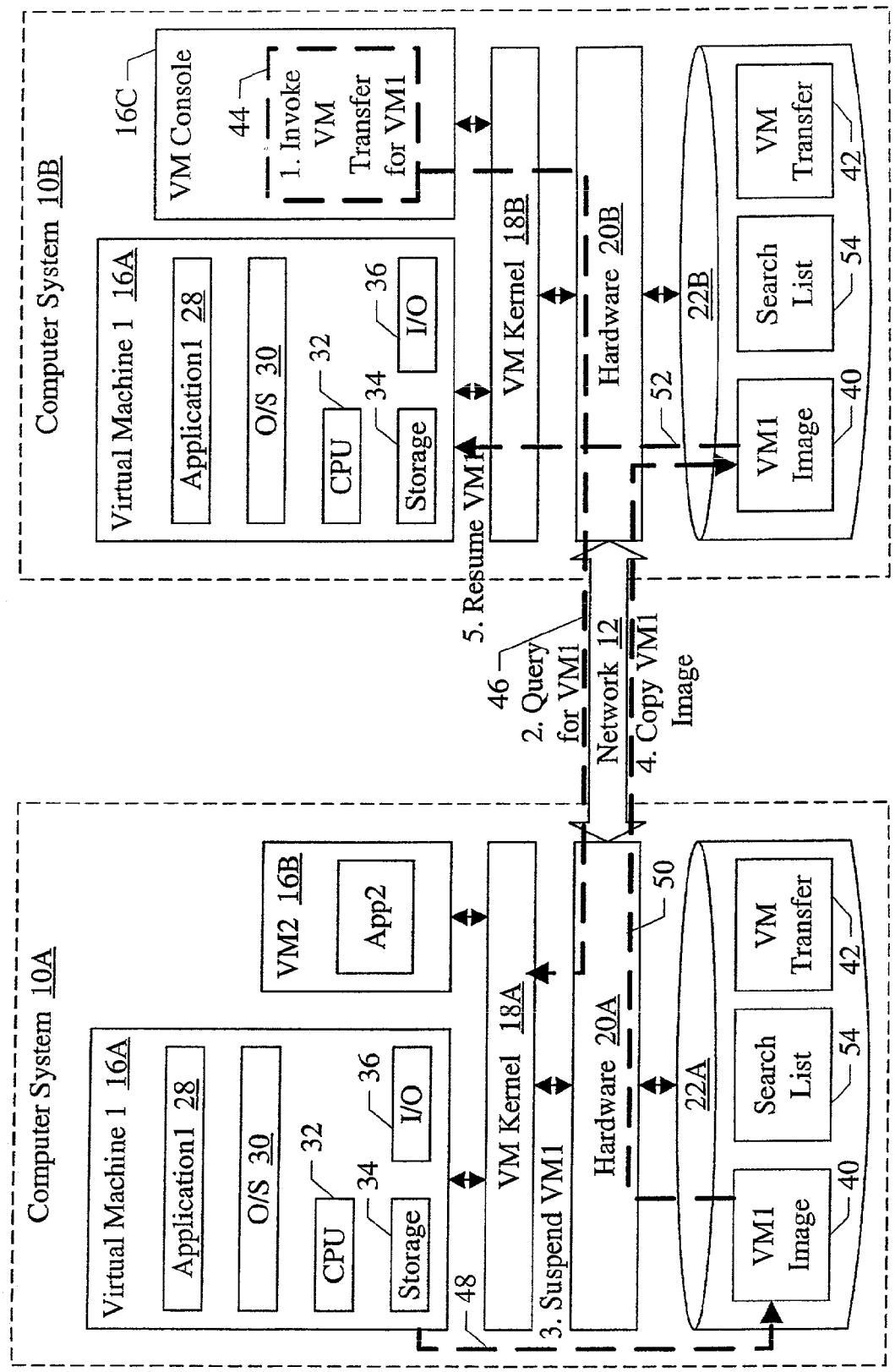
FIG. 1 is a block diagram of one embodiment of a pair of computer systems on which virtual machines may be executing and illustrating one embodiment of a transfer of a virtual machine between the computer systems.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

A user may be executing one or more applications on a first computer system and then may relocate to a second computer system. The user may cause the virtual machine(s) containing the applications that the user was using on the first computer system to be suspended on the first computer system, thereby creating an image of the virtual machine(s). The image of the virtual machine(s) may be moved to the second computer system, and the virtual machine(s) may be resumed on the second computer system. In this manner, the most recent updates to the data created and/or updated by the user while using the first computer system may be made available to the user on the second computer system. Even data which has not been committed to a file on the first computer system (e.g. updates made while the user was using the applications on the first computer system) may be made available to the user on the second computer system.

Since the virtual machine(s) are moved from the first computer system to the second computer system, the user may experience performance characteristics corresponding to the virtual machine(s) executing locally on the second computer system. The network connections between the first computer system and the second computer system may be used to transfer the virtual machine(s), but may not subsequently be required for the user to continue use of the applications on the second computer system.

Turning now to FIG. 1, a block diagram is shown illustrating one embodiment of a pair of computer systems. Other embodiments are possible and contemplated. In the embodiment of FIG. 1, computer systems 10A-10B are shown. The computer systems 10A-10B may be coupled via a network 12. Each of the computer systems 10A-10B includes one or more virtual machines (e.g. virtual machines 16A-16B on the computer system 10A and virtual machines 16A and 16C on the computer system 10B). The virtual machines are controlled by a virtual machine (VM) kernel (e.g. kernels 18A and 18B on the computer systems 10A and 10B, respectively). The virtual machines 16A-16C and the VM kernels 18A-18B may comprise software and/or data structures. The software may be executed on the underlying hardware in the computer systems 10A-10B (e.g. the hardware 20A and 20B in the computer systems 10A and 10B). The hardware may include any desired circuitry. For example, the hardware may include one or more processors, or central processing units (CPUs), storage, and input/output (I/O) circuitry. In the embodiment of FIG. 1, each computer system 10A-10B includes a storage device (storage devices 22A-22B in computer systems 10A-10B, respectively).

As shown in FIG. 1, each application executing on the computer systems 10A-10B executes within a virtual machine 16A-16C. Generally, a virtual machine comprises any combination of software, one or more data structures in memory, and/or one or more files stored on a storage device (such as the storage devices 22A-22B). The virtual machine mimics the hardware used during execution of a given application. For example, in the virtual machine 16A, an application 28 is shown. The application 28 is designed to execute within the operating system (O/S) 30. Both the application 28 and the O/S 30 are coded with instructions executed by the virtual CPU 32. Additionally, the application 28 and/or the O/S 30 may make use of various virtual storage devices 34 and virtual I/O devices 36. The virtual storage may include any type of storage, such as memory, disk storage, tape storage, etc. The disk storage may be any type of disk (e.g. fixed disk, removable disk, compact disc read-only memory (CD-ROM), rewriteable or read/write CD, digital versatile disk (DVD) ROM, etc.). Each disk storage in the virtual machine may be mapped to a file on a storage device such as the storage device 22A. Alternatively, each disk storage may be mapped directly to a storage device, or a combination of direct mappings and file mappings may be used. The virtual I/O devices may include any type of I/O devices, including modems, audio devices, video devices, network interface cards (NICs), universal serial bus (USB) ports, firewire (IEEE 1394) ports, serial ports, parallel ports, host bus adapters (HBAs), etc. Generally, each virtual I/O device may be mapped to a corresponding I/O device in the underlying hardware or may be emulated in software if no corresponding I/O device is included in the underlying hardware.

The virtual machine in which an application is executing encompasses the entire system state associated with an application. Generally, when a virtual machine is active (i.e. the application within the virtual machine is executing), the virtual machine may be stored in the memory of the computer system on which the virtual machine is executing (although the VM kernel may support a paging system in which various pages of the memory storing the virtual machine may be paged out to local storage in the computer system) and in the files which are mapped to the virtual storage devices in the virtual machine. The VM kernel may support a command to suspend the virtual machine. In response to the command, the VM kernel may write an image of the virtual machine to the storage device 22A (e.g. the image 40 shown in FIG. 1), thus capturing the current state of the executing application. The image may include one or more files written in response to the suspend command, capturing the state of the virtual machine that was in memory in the computer system, as well as the files representing the virtual storage in the virtual machine. The state may include not only files written by the application, but uncommitted changes to files which may still be in the memory within the virtual machine, the state of the hardware (including the processor 32, the memory in the virtual machine, etc.) within the virtual machine, etc. Thus, the image may be a snapshot of the state of the executing application.

A suspended virtual machine may be resumed using a resume command supported by the VM kernel. In response to the resume command, the VM kernel may read the image of the suspended virtual machine from the storage device and may activate the virtual machine in the computer system.

A first embodiment of transferring a virtual machine 16A from the first computer system 10A to the second computer system 10B is shown. Thick dashed lines illustrate the various operations which may occur in transferring the virtual machine 16A from the first computer system 10A to the second computer system 10B for this embodiment. In the embodiment of FIG. 1, a user may invoke a VM transfer program 42 to cause the virtual machine(s) including the desired applications and related data to be transferred to the computer system 10B. That is, when the user has relocated from the computer system 10A to the computer system 10B, the user may invoke the VM transfer program 42 on the second computer system 10B (reference numeral 44). In the present embodiment, the VM transfer program 42 is invoked in a virtual machine 16C which may be the console virtual machine in FIG. 1. A console virtual machine may be a virtual machine which has direct access to the hardware in the computer system on which it is executing. In other embodiments, the VM transfer program 42 may be invoked from a non-console virtual machine or from outside a virtual machine, as desired.

The VM transfer program 42 causes the computer system 10B to transmit a query to the computer system 10A (and more particularly to the VM kernel 18A) to determine if the desired virtual machine 16A is executing in the computer system 10A (reference numeral 46). More particularly, the query may include a name of the virtual machine 16A, which identifies the virtual machine 16A to the VM kernels 18A-18B. The name may be derived from the user name used by the user to log on to the computer systems 10A-10B. Additionally or alternatively, the name may be derived from the application or applications executing in the virtual machine. The name may be generated in any fashion, in various embodiments.

The VM kernel 18A may transmit a response to the query indicating whether or not the virtual machine 16A was detected as executing on the computer system 10A (e.g. a positive response indicating that the virtual machine 16A is executing on the computer system 10A or a negative response indicating that the virtual machine 16A is not executing on the computer system 10A). The response is not shown in FIG. 1. If the VM transfer program 42 receives a positive response, the VM transfer program 42 may transmit a suspend command to the VM kernel 18A to suspend the virtual machine 16A. Alternatively, the VM kernel 18A may suspend the virtual machine 16A in response to the query. For example, the query may include an indication that the virtual machine 16A is to be suspended if detected, or may be defined to cause a suspension of the virtual machine. Thus, the virtual machine 16A is suspended to the image 40 on the storage device 22A (reference numeral 48).

The VM transfer program 42 copies the image 40 to the second storage device 22B over the network 12 (reference numeral 50). The computer system 10B may have access to the second storage device 22B directly, or may communicate with the VM kernel 18A or other software on the computer system 10A to cause the copying of the files. Alternatively, the VM kernel 18A may transmit the image subsequent to suspending the virtual machine 16A. Any mechanism for copying the image may be used. For example, shared storage, NFS or SMB storage, secure copy (scp), file transfer protocol (ftp) or secure ftp (sftp), hypertext transport protocol (http), wget, remote copy (rcp), remote job entry (rje), unix to unix copy protocol (U-UCP), xmodem, ymodem, zmodem, kermit, napster, peer to peer (gnutella, freenet, etc.), rsync, concurrent versioning system (cvs) or other source code control systems, removable media that is transported between systems, etc. may be used. Finally, the VM transfer program 42 resumes the virtual machine 16A on the computer system 10B (reference numeral 52).

In the embodiment of FIG. 1, there are two computer systems 10A-10B illustrated which may be executing the virtual machine 16A. For example, the computer system 10A may be a computer system used by a user in the user's workplace, and the computer system 10B may be a computer system in the user's home. In other embodiments, the user may use more than two computer systems to access an application or applications. For example, the user may have access to multiple different computer systems at work and/or multiple computer systems at home. In another example, the computer systems may be at various physical locations in the user's workplace (e.g. multiple computer systems on a stock trading floor, at which buy and sell orders may be recorded).

If multiple possible computer systems are to be searched for a given virtual machine, a search list may identify each of the computer systems (e.g. the search list 54 on the storage device 22B). The search list may include the name of each computer system (e.g. a name which may be looked in a domain name system) or an address of the computer system on the network 12. The VM transfer program 42 may scan through the search list and send queries to each of the listed computer systems to try to locate the virtual machine 16A. The VM transfer program 42 may communicate one at a time with the computer systems in the list (e.g. transmitting a query and waiting for a positive or negative response) or may transmit queries to each computer system and wait for responses from the computer systems.

An alternative to the search list mechanism described herein may be to contact a central repository or "broker" that responds with the location of the virtual machine at a given point in time. Also, in some cases, even if multiple systems may be executing the virtual machine, the user may know where the virtual machine is and may specify the location to the VM transfer program. If shared storage is used, it may be possible to determine the owner of the virtual machine files (e.g. disk files) from the storage system, thus determining the computer system to contact. In yet another alternative, a dedicated communication mechanism (a "hailing frequency") can be built into the virtual machine or the layer underneath (e.g. the VM kernels) for locating the virtual machine.

The query, response, suspend, and resume commands may be part of a command set supported by the VM kernel 18A for communicating with other computer systems and/or virtual machines. Any transport mechanism may be used to convey the messages from the VM kernel 18A (e.g. TCP/IP, sockets, shared memory communications, mailboxes, etc.).

It is noted that the virtual machine 16A generally may be executing on only one computer system 10A-10B at any given time. In the illustrated embodiment, the VM transfer program 42 may be available to both the computer systems 10A-10B, so that the virtual machine image may be transmitted back and forth between the computer systems, as desired. The search list, if used, may also be provided on both the computer systems 10A-10B. The search list may differ on each computer system (e.g. the search list on the computer system 10A may include the computer system 10B and other computer systems but may not include the computer system 10A, and the search list on the computer system 10B may include the computer system 10A and the other computer systems but not the computer system 10B). Alternatively, the same search list may be used on each computer system.

In one embodiment, the storage device 22A may be local to the computer system 10A. Similarly, the storage device 22B may be local to the computer system 10B. A storage device may be considered local if the storage is a peripheral of the computer system (e.g. communicating via a peripheral bus of the computer system or coupled to a peripheral port of the computer system). A storage device may also be considered local if the storage is attached to a network to which the computer system is coupled and the computer system is capable of communicating directly with the storage device over the network (e.g. network attached storage (NAS) or storage area network (SAN) technology). Remote storage devices are not local to a given computer system. In one embodiment, the storage device 22A is remote to the computer system 10B and the storage device 22B is remote to the computer system 10A.

In one embodiment, the computer system 10B may access the storage device 22B with a lower latency than the storage device 22A. For example, in some implementations the computer system 10B may access the storage device 22B over a dedicated peripheral bus or a port on the computer system 10B, or over a local area network to which the computer system 10B is coupled. On the other hand, the computer system 10B may access the storage device 22A over the network 12 (and possibly through software executing on the computer system 10A, such as operating system software or the VM kernel 18A). The network 12 may be a wide area network, in some such embodiments. Similarly, the computer system 10A may access the storage device 22A with a lower latency that the storage device 22B.

In some implementations, the storage device 22B may be placed in closer physical proximity to the computer system 10B than the storage device 22A is placed. Similarly, the storage device 22A may be placed in closer proximity to the computer system 10A than the storage device 22B is placed.

It is noted that, while in the illustrated embodiment the image 40 of the virtual machine 16A is suspended to the storage device 22A and copied over the network 12 to the storage device 22B, other embodiments may suspend the virtual machine 16A to an image 40 on a shared storage device between the computer systems 10A-10B (e.g. the network 12 may be a shared storage device). In such embodiments, the explicit copying of the image 40 may be avoided.

The virtual hardware in the virtual machine 16A (and other virtual machines such as the virtual machine 16B) may be similar to the hardware 20A included in the computer system 10A. For example, the virtual CPU 32 may implement the same instruction set architecture as the processor(s) in the hardware 20A. In such cases, the virtual CPU 32 may be one or more data structures storing the processor state for the virtual machine 16A. The application and O/S software instructions may execute on the CPU(s) in the hardware 20A when the virtual machine 16A is scheduled for execution by the VM kernel 18A. When the VM kernel 18A schedules another virtual machine for execution (e.g. the virtual machine 16B), the VM kernel 18A may write the state of the processor into the virtual CPU 32 data structure. Alternatively, the virtual CPU 32 may be different from the CPU(s) in the hardware 20A. For example, the virtual CPU 32 may comprise software coded using instructions from the instruction set supported by the underlying CPU to emulate instruction execution according to the instruction set architecture of the virtual CPU 32. Alternatively, the VM kernel 18A may emulate the operation of the hardware in the virtual machine. Similarly, any virtual hardware in a virtual machine may be emulated in software if there is no matching hardware in the hardware 20A.

Different virtual machines which execute on the same computer system 10A may differ. For example, the O/S 30 included in each virtual machine may differ. Different virtual machines may employ different versions of the same O/S (e.g. Microsoft Windows NT with different service packs installed), different versions of the same O/S family (e.g. Microsoft Windows NT and Microsoft Windows2000), or different O/Ss (e.g. Microsoft Windows NT, Linux, Sun Solaris, etc.).

Generally, the VM kernel may be responsible for managing the virtual machines on a given computer system. The VM kernel may schedule virtual machines for execution on the underlying hardware, using any scheduling scheme. For example, a time division multiplexed scheme may be used to assign time slots to each virtual machine. Additionally, the VM kernel may handle the suspending and resuming of virtual machines responsive to suspend and resume commands. The commands may be received from a virtual machine, or may be communicated from another computer system. In one embodiment, the VM kernel may be the ESX product available from VMWare, Inc. (Palo Alto, Calif.).

In the illustrated embodiment, the VM kernel may execute directly on the underlying hardware (i.e. without an underlying operating system). In other embodiments, the VM kernel may be designed to execute within an operating system. For example, the GSX product available from VMWare, Inc. may execute under various versions of Microsoft's Windows operating system and/or the Linux operating system.

The network 12 may comprise any network technology in various embodiments. The network 12 may be a local area network, wide area network, intranet network, Internet network, or any other type of network. The network 12 may be designed to be continuously available (although network outages may occur), or may be intermittent (e.g. a modem connection made between a computer system in a user's home and a computer system in a user's workplace). Any network protocol may be used. For example, the network 12 may be an Ethernet network. Alternatively, the network may be a token ring network, etc. The network 12 may also represent shared storage between the computer systems 10A-10B.

The storage devices 22A-22B may be any type of storage device to which the computer systems 10A-10B may be coupled. For example, the storage devices 22A-22B may comprise one or more fixed disk drives such as integrated drive electronics (IDE) drives, small computer system interface (SCSI) drives, etc. The fixed disk drives may be incorporated as peripherals of the computer systems 10A-10B through a peripheral bus in the computer systems 10A-10B such as the peripheral component interconnect (PCI) bus, USB, firewire, etc. Alternatively, the storage devices 22A-22B may couple to the network 12 or a separate network (e.g. network attached storage (NAS) or storage area network (SAN) technologies may be used). The storage devices 22A-22B may be included in file servers to which the computer systems 10A-10B have access. The storage devices 22A-22B may also be removable disk drives, memory, etc. Generally, a storage device is any device which is capable of storing data.

Generally, the storage device 22A may be "accessible to" the computer system 10A and the storage device 22B may be "accessible to" the computer system 10B. As used herein, a storage device is "accessible to" a computer system if the storage device is directly connected to the computer system (e.g. via a peripheral bus or a port on the computer system) or if the storage device is otherwise accessible to the computer system (e.g. the storage is NAS or SAN storage, or the storage is included in another computer system, such as a file server, to which the computer system has a network connection, either direct or indirect).

It is noted that, while each virtual machine illustrated in FIG. 1 includes one application, generally a virtual machine may include one or more applications. For example, in one embodiment a user may execute all applications which execute on the same underlying O/S 30 in the same virtual machine. In the illustrated embodiment, the image of a suspended virtual machine is written to the storage device (e.g. the storage device 22A) and is transferred to another storage device (e.g. the storage device 22B) for resuming on another computer system. In other embodiments, the virtual machine image may be transmitted from one computer system to the other without involving the storage devices 22A-22B.

It is noted that the term "program", as used herein, refers to a set of instructions which, when executed, perform the function described for that program. The instructions may be machine level instructions executed by a CPU, or may be higher level instructions defined in a given higher level language (e.g. shell scripts, interpretive languages, etc.). The term "software" may be synonymous with "program".

Figures 2, 3:
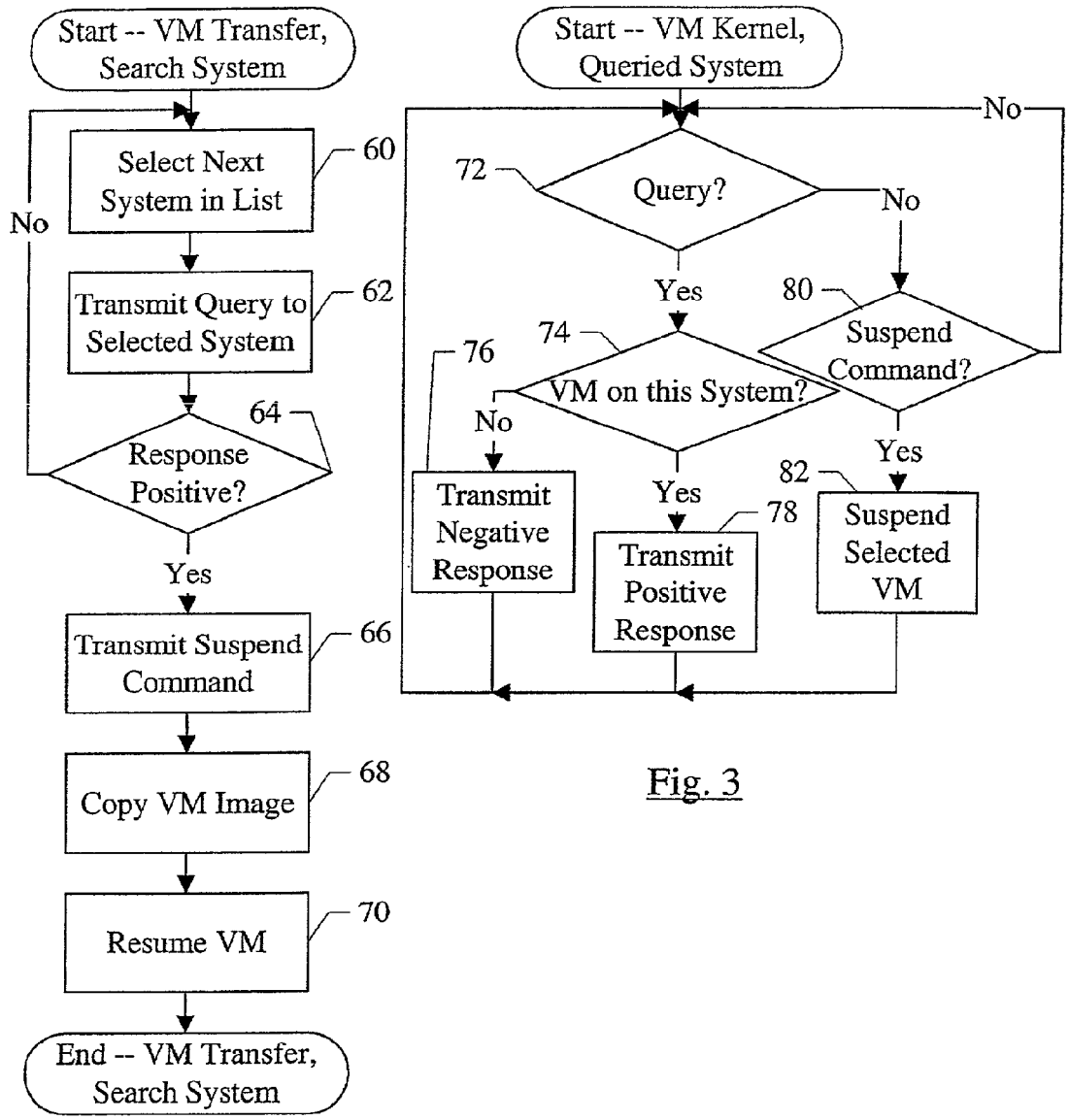
FIG. 2 is a flowchart illustrating one embodiment of VM transfer software illustrated in FIG. 1.
FIG. 3 is a flowchart illustrating one embodiment of a VM kernel on the computer systems shown in FIG. 1 in response to communication from the VM transfer software.

Turning next to FIG. 2, a flowchart is shown illustrating operation of one embodiment of the VM transfer program 42, when executed on a first computer system from which the search for a virtual machine is initiated (the "search" system). Other embodiments are possible and contemplated. The blocks shown in FIG. 2 may represent the operation of instructions forming the VM transfer program 42, when executed.

In the embodiment of FIG. 2, the VM transfer program 42 may support a search list of computer systems. Thus, the VM transfer program 42 may select the next computer system in the search list (block 60). The VM transfer program 42 transmits a query to that computer system to determine if the virtual machine is executing on that computer system (block 62). As an alternative to the search list, the user may supply the name of the virtual machine as an operand of the VM transfer program 42. For example, the name may be a command line option of the VM transfer program 42, if the VM transfer program 42 is invoked from the command line. Alternatively, if the user has a single virtual machine that the user moves among computer systems, the VM transfer program 42 may be coded with the name of the virtual machine.

In the illustrated embodiment, the VM transfer program 42 awaits a response from the queried computer system. If the response is positive (indicating that the requested virtual machine is executing on the queried computer system) (decision block 64, "yes" leg), the VM transfer program 42 may transmit a suspend command to the queried system to cause the suspension of the virtual machine 16A (block 66). The queried system may transmit a response when the suspension is completed (and thus the image of the virtual machine 16A is available on the storage device to which the VM kernel suspends the virtual machine 16A, such as the storage device 22A in FIG. 1), or the VM transfer program 42 may check for the files comprising the image to appear on the storage device. The VM transfer program 42 proceeds to copy the image of the virtual machine to the storage device accessible to the search system (block 68). The VM transfer program 42 then provides a resume command to the VM kernel on the search system, thus causing the virtual machine to be resumed on the search system (block 70). The resume uses the image transferred to the storage device by the VM transfer program 42.

If the response is negative (indicating that the request virtual machine is not executing on the queried computer system) (decision block 64, "no" leg), the VM transfer program 42 selects the next computer system in the search list and transmits the query to that system (blocks 60 and 62). If the virtual machine is not located on any of the systems, the VM transfer program 42 may abort or restart to attempt the search again. While this embodiment uses the search list to search various machines, other embodiments may not use the search list, as mentioned above.

The VM transfer program 42 may operate in concert with the VM kernel on the queried system to suspend the virtual machine and transfer the virtual machine to the search system. FIG. 3 is a flowchart illustrating operation of one embodiment of the VM kernel, when executed on a queried computer system (e.g. VM kernel 18A, although other VM kernels such as VM kernel 18B may operate similarly). Other embodiments are possible and contemplated. The blocks shown in FIG. 3 may represent the operation of instructions forming a portion of the VM kernel 18A, when executed. Particularly, the portion illustrated is the portion used to cooperate with the VM transfer program 42. Other portions of the VM kernel 18A may be used to manage virtual machines (including suspending and resuming virtual machines). The instructions used to implement the flowchart of FIG. 3 may also be separate from the VM kernel 18A (e.g. a program executing in a virtual machine maintained by the VM kernel, a shell script, or other software).

In the illustrated embodiment, the VM kernel 18A may determine if a received command is a query for a virtual machine (decision block 72). If the command is a query, the VM kernel 18A determines if the virtual machine identified in the query is executing on the queried system (decision block 74). If not, the VM kernel 18A transmits a negative response (block 76). If so, the VM kernel 18A transmits a positive response (block 78).

If the received command is not a query, the VM kernel 18A may determine if the received command is a suspend command (decision block 80). If so, the VM kernel 18A suspends the virtual machine (block 82). Optionally, the VM kernel 18A may transmit a response indicating that the suspend is completed.

If the received command is not a query or a suspend command, the VM kernel 18A may process the command in some other fashion (not shown).

It is noted that, while the VM transfer program 42 provides the resume command to the VM kernel on the search system in the embodiment illustrated in FIG. 2, the resume command may be separately provided by the user. Similarly, the user may manually perform any subset or all of the actions performed by the VM transfer program 42 illustrated in the various embodiments shown herein.

As mentioned above, in other embodiments, the VM transfer program 42 may not transmit separate query and suspend commands. Instead, the query command may include an indication that the virtual machine is to be suspended or may be defined to cause the suspension of the virtual machine. Similarly, the copying of the image of the suspended virtual machine may be initiated by the VM kernel on the queried machine, in some embodiments.

The embodiments illustrated in FIGS. 1-3 illustrate a "pull" mechanism for transferring a virtual machine from a first computer system to a second computer system. That is, the transfer is initiated from the second computer system. Other embodiments may support a "push" mechanism, in which the transfer may be initiated from the first computer system. Still other embodiments may employ both the push and pull mechanisms. An example of the push mechanism is shown in FIGS. 4-5.

Figure 4:
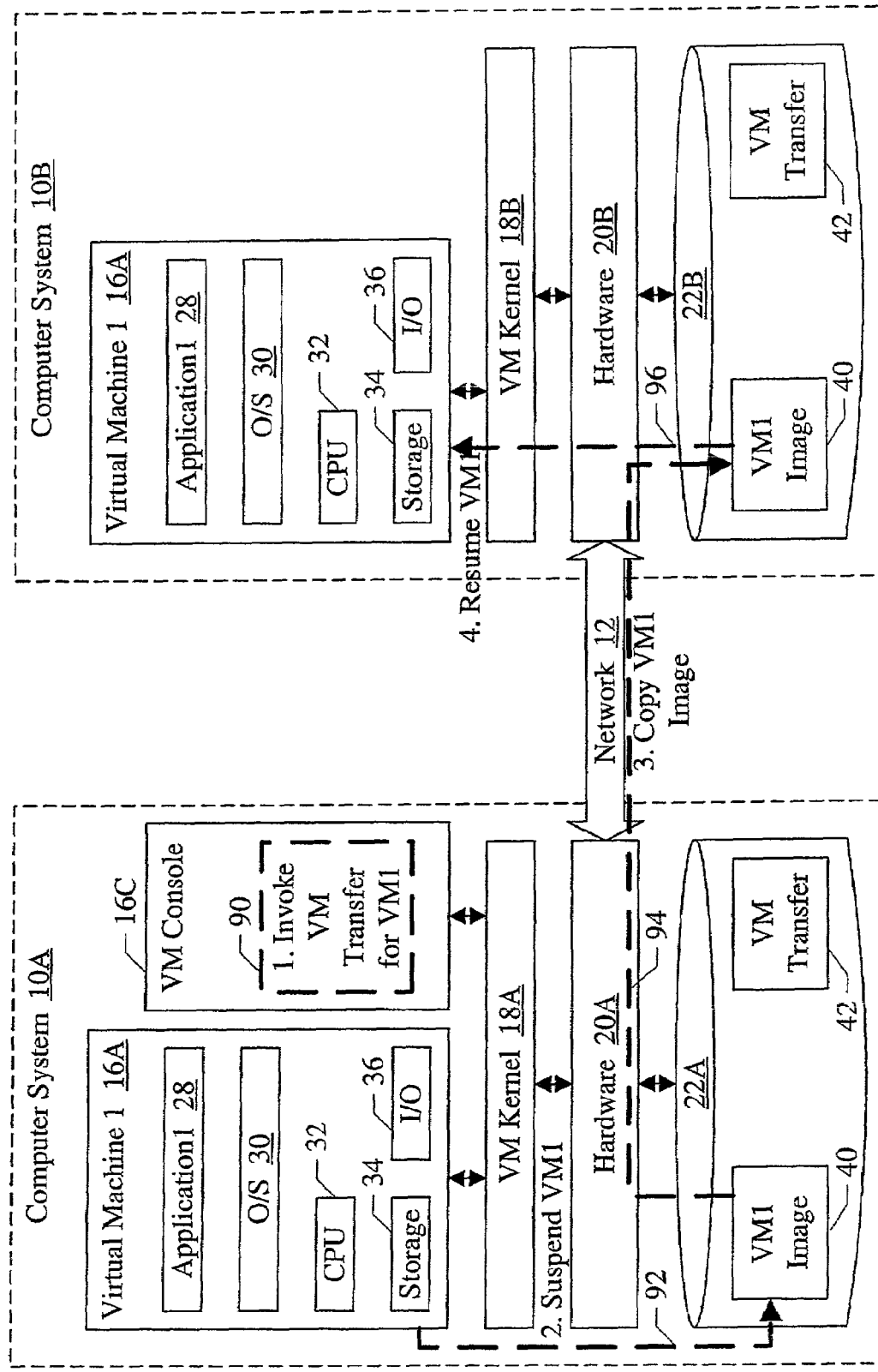
FIG. 4 is a block diagram of another embodiment of a pair of computer systems on which virtual machines may be executing and illustrating another embodiment of a transfer of a virtual machine between the computer systems.
Figure 5:
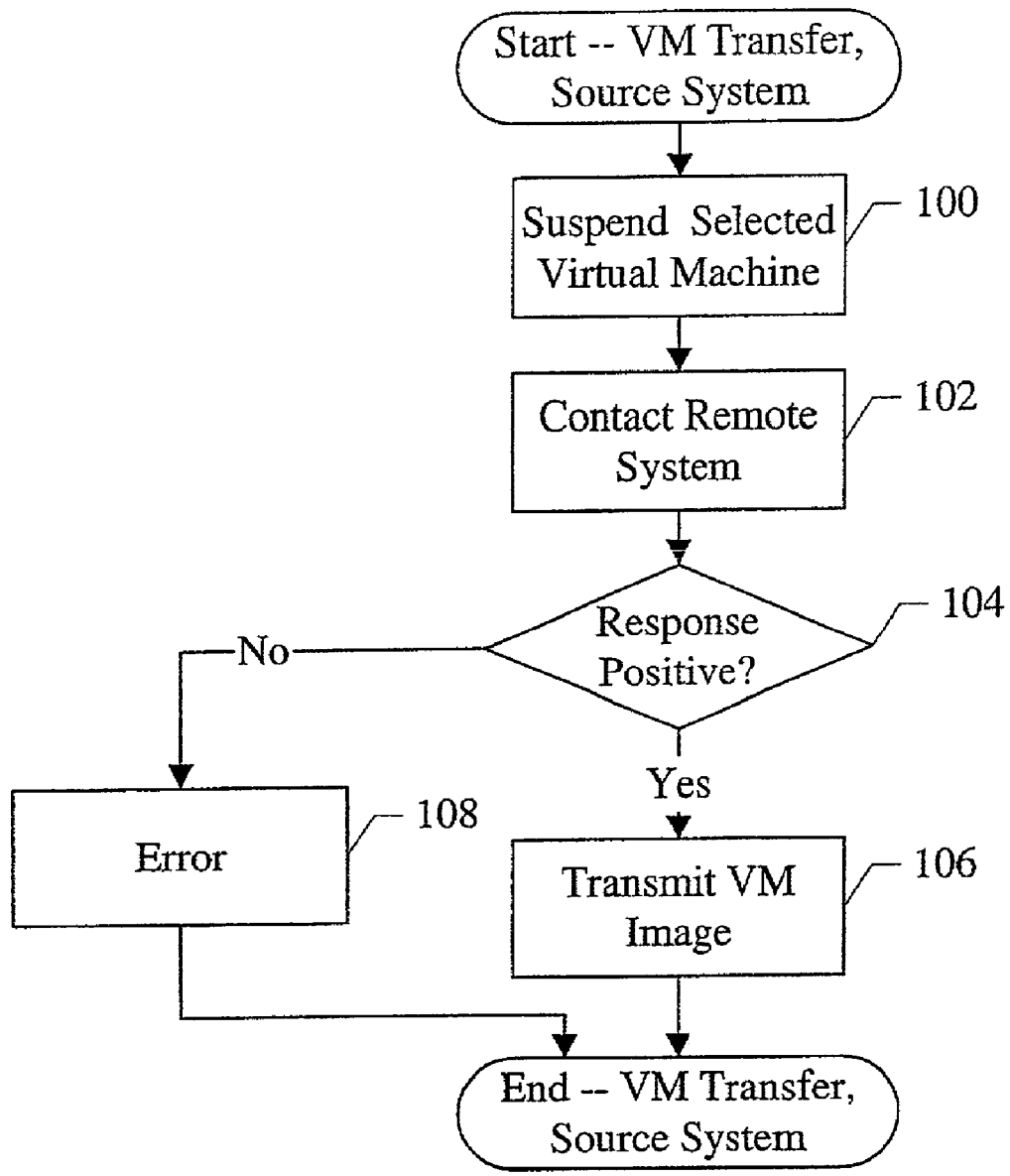
FIG. 5 is a flowchart illustrating one embodiment of VM transfer software illustrated in FIG. 4.

FIG. 4 is a block diagram illustrating another embodiment of the computer systems 10A and 10B. Other embodiments are possible and contemplated. In the embodiment of FIG. 4, the computer system 10A includes the virtual machine 16A (including the application 28, the O/S 30, the virtual CPU 32, the virtual storage 34, and the virtual I/O 36) and also includes the console virtual machine 16C. The computer system 10A includes the VM kernel 18A, the hardware 20A, and the storage device 22A similar to the computer system 10A shown in FIG. 1. The computer system 10B includes the virtual machine 16A (after being resumed from the image 40, as described below), the VM kernel 18B, the hardware 20B, and the storage device 22B, similar to the embodiment shown in FIG. 1. The computer systems 10A-10B are coupled via the network 12.

One embodiment of the push mechanism is illustrated in FIG. 4, using the thick dashed lines to illustrate various operations. In the embodiment of FIG. 4, the user may be executing the application 28 in the virtual machine 16A on the computer system 10A. The user may decide to relocate to the computer system 10B, and may invoke the VM transfer program 42. In the illustrated embodiment, the user may invoke the VM transfer program 42 in the console virtual machine 16C (reference numeral 90). Similar to the above description, the VM transfer program 42 may be passed the name of the virtual machine to transfer, or may be coded with the name of the virtual machine. The VM transfer program 42 may suspend the virtual machine 16A to the image 40 on the storage device 22A (reference numeral 92). The VM transfer program 42 may then initiate a transfer of the image 40 to the storage device 22B over the network 12 (reference numeral 94). The virtual machine 16A may be resumed on the computer system 10B from the image 40 stored on the storage device 22B (reference numeral 96).

In one implementation, the resuming of the virtual machine may not be part of the operation of the VM transfer program 42. That is, the VM transfer program 42 may not transmit the resume command to the computer system 10B. The user may input the resume command on the computer system 10B when arriving at the computer system 10B. In other embodiments, the VM transfer program 42 may transmit the resume command to the VM kernel 18B on the computer system 10B. By pushing the image 40 from the computer system 10A to the computer system 10B, the latency involved in transferring the image 40 over the network 12 may, in some cases, be incurred while the user is physically traveling between the computer system 10A and the computer system 10B.

The VM transfer program 42 is shown stored on both the storage device 22A and the storage device 22B in FIG. 4, thus allowing the virtual machine 16A to be pushed back and forth between the computer systems 10A and 10B as desired. While the VM transfer program 42 is shown as being invoked in the console virtual machine 16C in FIG. 4, in other embodiments the VM transfer program 42 may be invoked from a non-console virtual machine or from outside a virtual machine, as desired.

Similar to the discussion above with respect to FIG. 1, the storage device 22A may be local to the computer system 10A and the storage device 22B may be local to the computer system 22B, in one embodiment. In one embodiment, the storage device 22A is remote to the computer system 10B and the storage device 22B is remote to the computer system 10A.

In one embodiment, the computer system 10B may access the storage device 22B with a lower latency than the storage device 22A. Similarly, the computer system 10A may access the storage device 22A with a lower latency than the storage device 22B. In some implementations, the storage device 22B may be placed in closer physical proximity to the computer system 10B than the storage device 22A is placed. Similarly, the storage device 22A may be placed in closer proximity to the computer system 10A than the storage device 22B is placed.

It is noted that, while in the illustrated embodiment the image 40 of the virtual machine 16A is suspended to the storage device 22A and copied over the network 12 to the storage device 22B, other embodiments may suspend the virtual machine 16A to an image 40 on a shared storage device between the computer systems 10A-10B (e.g. the network 12 may be a shared storage device). In such embodiments, the explicit copying of the image 40 may be avoided.

FIG. 5 is a flowchart illustrating operation of one embodiment of the VM transfer program 42, when executed on a first computer system from which the push of a virtual machine is performed (the "source" system). Other embodiments are possible and contemplated. The blocks shown in FIG. 5 may represent the operation of instructions forming the VM transfer program 42, when executed.

The VM transfer program 42 may suspend the selected virtual machine for transfer (e.g. the virtual machine 16A in FIG. 4) (block 100). The VM transfer program 42 may communicate with the VM kernel (e.g. the VM kernel 18A in FIG. 4) to supply the suspend command to the VM kernel, which may carry out the suspension of the virtual machine. The VM transfer program 42 may contact the remote system to which the image 40 is to be transferred (e.g. the computer system 10B in FIG. 4) (block 102). The contact may be made in any desired fashion. For example, if ftp is being used, the contact may be the attempt to log in to the remote system. Alternatively, the VM transfer program 42 may attempt to "ping" the remote system or communicate with the remote system in some other fashion to determine that the remote system can be reached.

If the response to the attempt to contact the remote system is positive (e.g. the remote system is successfully contacted) (decision block 104), the VM transfer program 42 transmits the virtual machine image 40 to the remote system (block 106). The remote system may store the image 40 on the storage device accessible thereto (e.g. the storage device 22B for the embodiment of FIG. 4). On the other hand, if the response to the attempt to contact the remote system is negative (e.g. the remote system is not successfully contacted or refused to communicate), the VM transfer program 42 may report an error (block 108). In this manner, the user may be informed that the virtual machine transfer did not complete correctly.

It is noted that, while the "push" embodiment shown in FIGS. 4 and 5 above involves the source system performing most of the push operation, other embodiments are contemplated. For example, in another embodiment, the source system may contact the remote system and cause the remote system to perform a "pull" (e.g. similar to the embodiments described above with respect to FIGS. 1-3). The contact and causing the remote system to perform the "pull" may be manually performed by the user on the source system, or may involve software on the source system, or a combination of manual input by the user and software.

In another embodiment, the first computer system on which a virtual machine is active may periodically push the image of the virtual machine to the second computer system, or may even continuously push the incremental changes to the second computer system. The periodic or continuous pushes may be performed in a manner similar to that described above, except that the virtual machine continues executing on the first computer system after each push and is not resumed on the second computer system after each push. Alternatively, the second computer system may periodically pull the image of the virtual machine from the first computer system (similar to the above pull description, with the exception that the virtual machine continues executing on the first computer system after each pull and is not resumed on the second computer system after each pull). When the user arrives at the second computer system, the user may elect to resume from the most recent periodic push (or pull), or may pull the current image from the first computer system. In either case, the user may cause the virtual machine to be suspended on the first computer system, so that the virtual machine is active at any given time on only one computer system.

It is noted that, in various embodiments shown above, the VM transfer program 42, the search list 54, and/or the image 40 of the virtual machine 16A are shown stored on various storage devices. Generally, any one or more of the above (and/or the VM kernel 18A, the O/S 30, the application 28, etc.) may be carried on a carrier medium. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a first computer system on which a first virtual machine is executing during use, wherein the first virtual machine comprises at least one application and at least one operating system on which the application is designed to execute; and
   a second computer system coupled to communicate, at least intermittently, with the first computer system, wherein, in response to a request initiated by a user of the first virtual machine, the second computer system is configured to query the first computer system to locate the first virtual machine executing on the first computer system, and wherein the first virtual machine is transferred from the first computer system to the second computer system subsequent to the query locating the first virtual machine on the first computer system.

2. The apparatus as recited in claim 1 wherein the first computer system is configured to suspend the first virtual machine to an image of the first virtual machine, and wherein the image is transmitted to the second computer system, and wherein the second computer system is configured to resume the first virtual machine from the image.

3. The apparatus as recited in claim 2 further comprising:
   a first storage device accessible to the first computer system; and
   a second storage device accessible to the second computer system;
   wherein the first computer system is configured to store the image of the first virtual machine to the first storage device, and wherein the second storage device is configured to store the image transmitted from the first computer system.

4. The apparatus as recited in claim 3 wherein a latency for the second computer system to access the second storage device is less than the latency to access the first storage device.

5. The apparatus as recited in claim 3 wherein the second storage device is local to the second computer system and the first storage device is local to the first computer system.

6. The apparatus as recited in claim 5 wherein the first storage device is remote to the second computer system.

7. The apparatus as recited in claim 3 wherein the second storage device is placed in closer proximity to the second computer system than the first storage device is placed to the second computer system.

8. The apparatus as recited in claim 1 wherein the request is provided through the second computer system.

9. The apparatus as recited in claim 8 wherein the second computer system is configured to search one or more computer systems including the first computer system for the first virtual machine, wherein the query is part of the search.

10. The apparatus as recited in claim 1 wherein the request is provided through the first computer system.

11. The apparatus as recited in claim 10 wherein a second request is used to resume the first virtual machine on the second computer system.

12. A storage medium comprising instructions which, when executed in response to a request initiated by a user of a first virtual machine, query a first computer system to locate the first virtual machine executing on the first computer system, and cause a transfer of the first virtual machine from the first computer system which is executing the first virtual machine to a second computer system subsequent to locating the first virtual machine on the first computer system using the query, wherein the first virtual machine comprises at least one application and at least one operating system on which the application is designed to execute.

13. The storage medium as recited in claim 12, wherein the instruction cause the transfer by:
  (i) causing the first computer system to suspend the first virtual machine to an image of the first virtual machine; and
  (ii) causing the image to be transmitted to the second computer system.

14. The storage medium as recited in claim 13 wherein the instructions, when executed, cause the image to be stored to a first storage device accessible to the first computer system, and wherein the instructions, when executed, further cause the image to be stored on a second storage device accessible to the second computer system.

15. The storage medium as recited in claim 14 wherein the instructions, when executed, resume the first virtual machine on the second computer system from the image on the second storage device.

16. The storage medium as recited in claim 15 wherein the instructions execute, during use, on the second computer system.

17. The storage medium as recited in claim 12 wherein the instructions search one or more computer systems including the first computer system to locate the first virtual machine prior to causing the transfer, wherein the query is part of the search.

18. The storage medium as recited in claim 17 wherein the instructions transmit a message to each of the one or more computer systems indicating the first virtual machine, and wherein the first computer system responds to the message to indicate that the first virtual machine is executing on the first computer system.

19. The storage medium as recited in claim 12 wherein the instructions execute, during use, on the first computer system.

20. A method comprising:
  executing a first virtual machine on a first computer system, wherein the first virtual machine comprises at least one application and at least one operating system on which the application is designed to execute;
  a user of the first virtual machine initiating a request to transfer the first virtual machine executing on the first computer system to a second computer system;
  querying the first computer system to locate the first virtual machine executing on the first computer system; and
  transferring the first virtual machine to the second computer system responsive to the request and subsequent to locating the first virtual machine on the first computer system using the query.

21. The method as recited in claim 20 wherein the transferring comprises:
  suspending the first virtual machine from the first computer system to an image of the first virtual machine; and
  resuming the first virtual machine from the image.

22. The method as recited in claim 21 further comprising:
  storing the image of the first virtual machine on a first storage device accessible to the first computer system; and
  copying the image from the first storage device to a second storage device accessible to a second computer system.

23. The method as recited in claim 20 further comprising searching one or more computer systems including the first computer system prior to the transferring, wherein the querying is part of the searching.

24. A computer system comprising the storage medium recited in claim 12 and hardware circuitry coupled to the storage medium and configured to execute the instructions.

* * * * *

UNITED STATES PATENT AND TRADEMARK OFFICE
CERTIFICATE OF CORRECTION

PATENT NO. : 7,603,670 B1  Page 1 of 1
APPLICATION NO. : 10/109406
DATED : October 13, 2009
INVENTOR(S) : Hans F. van Rietschote It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1945 days.

Signed and Sealed this

Fourteenth Day of December, 2010

David J. Kappos
*Director of the United States Patent and Trademark Office*